Patented Feb. 10, 1953

2,628,235

UNITED STATES PATENT OFFICE 2,628,235

8-ARYLPURINE DERIVATIVES AND PROCESS OF PREPARING SAME

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application February 15, 1950, Serial No. 144,395

12 Claims. (Cl. 260—252)

The present invention is concerned with new purine derivatives and is based on the discovery that certain derivatives of 8-arylpurine act as growth inhibitors in a variety of biological systems and have valuable therapeutic properties as a result of this activity.

The compositions revealed in the present application may be represented as substituted 2-amino-8-arylpurines of the formula:

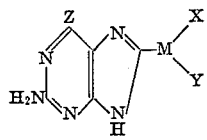

where M is an aryl radical of not more than 2 rings, Z is a substituent selected from the class consisting of chlorine, bromine, hydroxyl, amino, hydrazino, thiol, alkylthio and substituted amino of the type

where $R_1$ is a radical selected from the group consisting of hydrogen, lower alkyl and aryl and $R_2$ is a lower alkyl radical and $R_1$ and $R_2$ together may represent the components of a cyclic system, and where X is a radical selected from the class consisting of hydrogen, amino, chlorine, bromine, lower alkyl and alkoxyl and Y is selected from the class consisting of hydrogen, amino, chlorine, bromine, lower alkyl and alkoxyl, carboxy, carbalkoxy and carbamido radicals.

The processes of the present invention involve the preliminary preparation of an amide of a 2,4,5-triaminopyrimidine with subsequent ring closure to form the purine. The amide may be prepared by treatment of the pyrimidine, or a suitable acid salt of the pyrimidine with the acid chloride in the presence of an alkali. The ring closure of the benzamidopyrimidine to the purine may be effected simply by heating the compound to its melting point, and this is indeed the preferred procedure in many instances. In other instances it is preferred to heat the amide with phosphorylchloride. In the case of 5-benzamido-2,4-diamino-6-hydroxy-pyrimidines this results in ring closure to the purine and simultaneous chlorination resulting in a 2-amino-6-chloro-8-phenylpurine. The 6-chloropurine so formed is capable of transformation in a variety of ways. It may be replaced by other groups by treatment of the reactive chlorocompounds with ammonia, amines, alkali hydrosulfide, or by hydrolysis the hydroxyl group may be restored to this position.

The following examples serve to illustrate the teachings of the present invention, but are not intended in any way to limit the invention, the scope of which is defined in the claims.

EXAMPLE 1

*2,6-diamino-8-p-chlorophenylpurine*

37.5 g. of 2,4,5,6-tetraminopyrimidine sulfite was dissolved in 200 ml. of 1 N sodium hydroxide. To this solution was added alternately, with continued stirring, 100 ml. of 2 N sodium hydroxide and 36.4 g. of p-chlorobenzoyl chloride, the pH of the solution being kept between 8 and 9 and the temperature between 10–20° throughout the reaction. The reaction mixture was allowed to stand at 4° overnight and the precipitate filtered off, washed with water, alcohol and ether and dried at 100°. The yield was 36 g. of 2,4,6-triamino-5-p-chlorobenzamido pyrimidine.

8.2 g. of 2,4,6-triamino-5-p-chlorobenzamido pyrimidine was heated for 1 hour at 260–270°. Water vapor was given off and the solid turned dark. After cooling, the solid was dissolved in 500 ml. of 0.2 N sodium hydroxide, filtered and the filtrate acidified to pH 5 with glacial acetic acid. The precipitate was collected by centrifugation, washed with water, alcohol and ether and boiled with 4 liters of 1 N hydrochloric acid. The acid solution was filtered hot and brought to pH 5 by addition of sodium hydroxide. 3.9 g. of 2,6-diamino-8-chlorophenyl purine basic hydrochloride were obtained on cooling.

EXAMPLE 2

*2,6-diamino-8-o-chlorophenylpurine*

2,4,6-triamino-5-o-chlorobenzamido pyrimidine was prepared from 2,4,5,6-tetraaminopyrimidine sulfite and o-chlorobenzoyl chloride in the same manner as described in Example 1 for the corresponding p-chloro derivative.

12 g. of 2,4,6-triamino-5-o-chlorobenzamido pyrimidine was heated at 250°–260° for 1 hour. The residue was dissolved in 500 ml. of 1 N sodium hydroxide, filtered and the filtrate acidified to pH 5 with acetic acid. The precipitate was collected by centrifugation, washed with water, alcohol and ether and dried at 110°. The precipitate was boiled with 1,500 ml. of 1 N hydrochloric acid, a small amount of insoluble material filtered off and the hot acid filtrate brought to pH 5 by the addition of saturated sodium hydroxide solution. After cooling to 4°, the yellow precipitate was collected, washed and dried at 110°. The yield was 6 g. of 2,6-diamino-8-o-chlorophenyl purine basic hydrochloride.

EXAMPLE 3

*2,6-diamino-8-m-chlorophenylpurine*

8.3 g. of 2,4,6-triamino-5-m-chlorobenzamidopyrimidine, prepared in the usual manner, was heated at 270°–280° for 1 hour. The molten solid, after cooling, was dissolved in 250 ml. of 1 N sodium hydroxide and the alkaline solution filtered into 2 liters of boiling 1 N hydrochloric acid. The acid solution was filtered hot to remove an insoluble residue and the hot filtrate brought to pH 5 by the addition of saturated sodium hydroxide solution. After cooling, the precipitate of 2,6-diamino-8-m-chlorophenylpurine basic hydrochloride was filtered off, washed with water, alcohol and ether and dried at 110°; the yield was 2.8 g.

EXAMPLE 4

*2,6-diamino-8-nitrophenylpurine*

10.85 g. of crude 2,4,6-triamino-5-p-nitrobenzamidopyrimidine, prepared in the usual manner, was heated at 260° for 45 minutes. The residue leached with 100 ml. of acetone to remove any p-nitrobenzoic acid contaminant, air dried, then treated with 500 ml. of 0.05 N sodium hydroxide solution. An insoluble residue was filtered off and the alkaline filtrate poured slowly into 500 ml. hot water containing 25 ml. of glacial acetic acid. The orange precipitate, after cooling, was collected by centrifugation, washed with water alcohol and ether and dried at 110°; yield 4.95 g. of 2,6-diamino-8-p-nitrophenylpurine hydrate.

EXAMPLE 5

*2,6-diamino-8-p-nitrophenylpurine*

16 g. of 2,4,6-triamino-5-p-nitrobenzamidopyrimidine was refluxed with 375 ml. of phosphorus oxychloride for 10 hours. The reaction mixture was taken down almost to dryness on the steam bath under reduced pressure and the residue decomposed with 500 g. of ice. The precipitate was filtered off, dissolved in 600 ml. of 0.05 N sodium hydroxide and the alkaline solution filtered into 400 ml. of hot water containing 25 ml. of glacial acetic acid. After cooling the orange precipitate was collected by centrifugation, washed with water, alcohol and dried at 110°. The yield was 7.85 g. of 2,6-diamino-8-p-nitrophenylpurine hydrate.

EXAMPLE 6

*2,6-diamino-8-m-nitrophenylpurine*

15 g. of 2,4,6-triamino-5-m-nitrobenzamidopyrimidine, prepared in the usual manner, was heated at 240° for 30 minutes. The residue was cooled, dissolved in 600 ml. of 0.3 N sodium hydroxide and the alkaline solution filtered into 300 ml. of hot water containing 50 ml. of glacial acetic acid. After cooling, the precipitate was filtered off, boiled with 3 liters of 1 N hydrochloric acid. The acid solution was filtered hot, and 3 g. of 2,6-diamino-8-m-nitrophenylpurine hydrochloride hydrate were filtered off after chilling. Another 1.9 g. of the purine, in the form of the basic hydrochloride, was recovered from the acid filtrate by adjusting the pH to 5 with sodium hydroxide.

EXAMPLE 7

*2,6-diamino-8-p-carbomethoxyphenylpurine*

9.3 g. of 2,4,6-triamino-5-p-carbomethoxybenzamidopyrimidine, prepared from 2,4,5,6-tetraaminopyrimidine dihydrochloride and p-carbomethoxybenzoylchloride in the usual manner, was heated at 260–270° for 1 hour. The dark residue was treated with 600 ml. of 0.5 N sodium hydroxide and the alkaline solution filtered into 300 ml. of hot water containing 50 ml. of glacial acetic acid. The brown precipitate was collected by centrifugation, redissolved in 350 ml. of 0.3 N sodium hydroxide and filtered into 500 ml. of boiling water containing 80 ml. of concentrated hydrochloric acid. The acid solution was filtered hot and the filtrate allowed to cool overnight. The yellow precipitate of 2,6-diamino-8-p-carbomethoxyphenylpurine hydrochloride hydrate weighed 2.5 g. after filtration, washing and drying at 100°. On adjustment of the pH to 5, another 1.8 g. of this purine in the form of the basic hydrochloride was isolated.

EXAMPLE 8

*2,6-diamino-8-p-methoxyphenylpurine*

8 g. of 2,4,6-triamino-5-p-methoxybenzamidopyrimidine prepared in the usual manner, was refluxed with 250 ml. of phosphorus oxychloride for 4 hours. The reaction mixture was taken to dryness under reduced pressure and the residue mixed with 300 g. of ice. The precipitate was filtered off, dissolved in 200 ml. of 0.5 N sodium hydroxide and the alkaline solution filtered into 300 ml. of hot water containing 25 ml. of glacial acetic acid. The precipitate was collected after cooling, washed with water, alcohol and ether, and dried at 110°. The yield of crude 2,6-diamino-8-p-methoxyphenylpurine was 5.7 g. This crude material contained some bound phosphorus. However, after boiling with 2 N hydrochloric acid for 30 minutes and subsequent recrystallization from 1 N hydrochloric acid, the phosphorus was removed.

EXAMPLE 9

*2,6-diamino-8-m-bromophenylpurine*

10 g. of 2,4,6-triamino-5-m-bromobenzamidopyrimidine, prepared in the usual manner, was refluxed with 250 ml. of phosphorus oxychloride for 8 hours. The reaction mixture was taken to dryness under reduced pressure, treated with 300 g. of crushed ice and the precipitate collected by filtration. The precipitate was dissolved in 375 ml. of 0.4 N sodium hydroxide, the alkaline solution filtered and the filtrate brought to pH 5 by the addition of glacial acetic acid. After centrifugation, washing and drying at 110°, the precipitate of crude 2,6-diamino-8-m-bromophenylpurine weighed 9.5 g.

EXAMPLE 10

*2,6-diamino-8-phenylpurine*

2 g. of 2,4,6-triamino-5-benzamidopyrimidine, prepared in the usual manner, was refluxed for 3 hours with 100 ml. of phosphorus oxychloride. The mixture was taken to dryness under reduced pressure and the residue treated with 100 ml. of ice water. After the mixture had been made alkaline by the addition of concentrated ammonium hydroxide, the solution was filtered and the filtrate adjusted to pH 5 with acetic acid. The precipitate was filtered off and purified twice more by solution in dilute ammonium hydroxide and precipitation at pH 5 with acetic acid; yield, 1.5 g. of 2,6-diamino-8-phenylpurine.

EXAMPLE 11

*2,6-diamino-8-(3',5'-dinitrophenyl) purine*

10 g. of 2,4,6-triamino-5 (3',5'-dinitrobenzamido) pyrimidine, prepared in the usual manner, was refluxed for 8 hours with 250 ml. of phosphorus oxychloride. After cooling the reaction mixture was filtered and the insoluble residue treated with 350 g. of ice. The precipitate was collected by filtration and, after recrystallization from 1 liter of 1 N hydrochloric acid, gave 2 g. of 2,6-diamino-8-(3',5'-dinitrophenyl) purine hydrochloride and, on adjustment of the pH of this acid filtrate to 5, another 0.5 g. of the basic hydrochloride of the same purine.

EXAMPLE 12

*2,6-diamino-8-β-naphthylpurine*

8.25 g. 2,4,6-triamino-5-β-naphthoylaminopyrimidine, prepared from 2,4,5,6-tetraaminopyrimidine hydrochloride and β-naphthoylchloride, was heated at 250° for 1½ hours. The residue was dissolved in 300 ml. of 0.6 N sodium hydroxide, filtered and the filtrate poured into 200 ml. of dilute acetic acid. After cooling, filtration and drying at 110°, the yield of 2,6-diamino-8-β-naphthylpurine was 4.5 g.

EXAMPLE 13

*2-amino-6-hydroxy-8-phenylpurine*

29.2 g. of 2,4,5-triamino-6-hydroxypyrimidine sulfite was dissolved in 100 ml. of water and 80 ml. of 2 N sodium hydroxide. To this solution, kept at 10–15°, were added alternately, with stirring, 80 ml. of 2 N sodium hydroxide and 22.6 g. of benzoylchloride, the pH being kept at ca. 8 throughout. After standing overnight at 4°, the mixture was brought to pH 6 by addition of acetic acid and the precipitate collected, washed with water, alcohol and ether and dried at 100°. The yield was 19 g. of 2,4-diamino-5-benzamido-6-hydroxypyrimidine.

5 g. of 2,4-diamino-5-benzamido-6-hydroxypyrimidine was mixed in a mortar with 3 g. of benzamide and the mixture heated at 280–300° for 30 minutes. After cooling, the mixture was leached with 100 ml. of ether and the insoluble residue then dissolved in 350 ml. of 0.3 N sodium hydroxide. The alkaline solution was filtered and acidified to pH 5 with acetic acid. The precipitate was collected by filtration, boiled with 700 ml. of 1.2 N hydrochloric acid, and the acid solution filtered hot. On neutralization to pH 5 with sodium hydroxide and cooling, 1.85 g. of 2-amino-6-hydroxy-8-phenylpurine was collected.

EXAMPLE 14

*2-amino-6-chloro-8-phenylpurine*

10 g. of 2,4-diamino-5-benzamido-6-hydroxypyrimidine, prepared as above, was refluxed with 300 ml. of phosphorus oxychloride for 5 hours. The reaction mixture was taken to dryness under reduced pressure and treated with 400 g. of chopped ice. The precipitate was collected, dissolved in 300 ml. of 0.3 N sodium hydroxide and the alkaline solution brought to pH 5 with acetic acid. After centrifugation, washing with water and drying at 100° the precipitate of 2-amino-6-chloro-8-phenylpurine hydrate weighed 8.25 g.

EXAMPLE 15

*2-amino-6-hydroxy-8-phenylpurine*

1 g. of crude 2-amino-6-chloro-8-phenylpurine hydrate was refluxed for 1 hour with 40 ml. of 2 N hydrochloric acid. After cooling, the precipitate was collected, washed with water, alcohol and ether and dried at 120°. The product, which was identified as 2-amino-6-hydroxy-8-phenylpurine hydrochloride, weighed 0.7 g.

EXAMPLE 16

*2-amino-6-hydroxy-8-p-nitrophenylpurine*

8.4 g. of 2,4-diamino-5-p-nitrobenzamido-6-hydroxypyrimidine, prepared in the usual manner, was mixed with 9 g. of p-nitrobenzamide and the mixture heated at 300° for 1 hour. The residue was cooled, leached with 200 ml. of ether and dissolved in 1 liter of 0.2 N sodium hydroxide. The alkaline solution was filtered, brought to pH 5 with acetic acid and the precipitate collected by centrifugation. After washing with water, alcohol and ether, the precipitate of 2-amino-6-hydroxy-8-p-nitrophenylpurine weighed 3.0 g.

EXAMPLE 17

*2-amino-6-chloro-8-p-chlorophenylpurine*

18.2 g. of 2,4,5-triamino-6-hydroxypyrimidine sulfite was dissolved in 25 ml. of 2 N sodium hydroxide. To this solution, kept at 10–15° were added alternately, with stirring 25 ml. of 2 N sodium hydroxide and 17.5 g. of p-chlorobenzoylchloride, the pH being kept at 7–8. After standing overnight, the mixture was acidified to pH 5 and the product filtered off, washed and dried. The yield of 2,4-diamino-6-hydroxy-5-p-chlorobenzamidopyrimidine was 14.7 g.

10 g. of 2,4-diamino-5-p-chlorobenzamido-6-hydroxypyrimidine, prepared in the above manner, was refluxed with 200 ml. of phosphorus oxychloride for 2 hours. The solution was taken to dryness under reduced pressure and the residue poured into 300 g. of ice. After the precipitate was collected it was treated with 300 ml. of water and 50 ml. of 2 N sodium hydroxide. The alkali-insoluble portion was filtered off and the alkaline filtrate acidified to pH 5 with acetic acid. The pale yellow precipitate after filtration, washing with water and drying at 100°, consisted of 7.1 g. of 2-amino-6-chloro-8-p-chlorophenylpurine hydrate.

EXAMPLE 18

*2-amino-6-p-chloroanilino-8-p-chlorophenylpurine*

1.2 g. of 2-amino-6-chloro-8-p-chlorophenylpurine, prepared as above, was heated with 1.4 g. of p-chloroaniline for 30 minutes at 200°. The reaction mixture was cooled and leached first with 50 ml. of ether and then with 50 ml. of sodium hydroxide. The insoluble residue was washed with water, boiled with 250 ml. absolute ethanol and the solution filtered hot. On dilution of the alcoholic filtrate with an equal volume of water and cooling, 0.8 g. of 2-amino-6-p-chloroanilino-8-p-chlorophenylpurine were precipitated.

EXAMPLE 19

*2 amino-6-n-butylamino-8-p-chlorophenylpurine*

To 0.85 g. of 2-amino-6-chloro-8-p-chlorophenylpurine were added 2 ml. of n-butylamine, 0.1 ml. of concentrated hydrochloric acid and 5 ml. of absolute ethanol. The mixture was refluxed for 30 minutes and then evaporated almost to dryness on a steam bath. The residue was diluted to 100 ml. with water, made strongly acidic with hydrochloric acid and the insoluble yellow residue filtered off, washed with water, alcohol and dried at 120°. The yield of 2-amino-6-n-butylamino-8-p-chlorophenylpurine was 0.8 g.

EXAMPLE 20

2-amino-6-hydroxy-8-phenylpurine 4.9 g. of 2,4-diamino-5-benzamido-6-hydroxypyrimidine was dissolved in 10 ml. of 2 N sodium hydroxide and the solution taken to dryness on the steam bath under reduced pressure. The sodium salt thus obtained was heated at 280° for 1 hour. Water was given off and the solid turned dark. After cooling, the residue was dissolved in 400 ml. of water containing 10 ml. of 2 N sodium hydroxide. The alkaline solution was filtered and acidified with acetic acid. The precipitate after filtration, washing and drying at 100° consisted of 2.4 g. of crude 2-amino-6-hydroxy-8-phenylpurine.

EXAMPLE 21

2-amino-6-piperidino-8-phenylpurine 1 g. of crude 2-amino-6-chloro-8-phenylpurine was refluxed with 2 ml. of piperidine, 5 ml. of absolute ethanol and 0.1 ml. of concentrated hydrochloric acid for 1 hour. The reaction mixture was then diluted with 150 ml. of water, acidified with hydrochloric acid and the insoluble residue collected. This residue consisted of 0.5 g. of crude 2-amino-6-piperidino-8-phenylpurine.

EXAMPLE 22

2-amino-6-thiol-8-p-chlorophenylpurine 4 g. of crude 2-amino-6-chloro-8-p-chlorophenylpurine and 50 ml. of 1.8 N sodium hydrosulfide solution were placed in a bomb and heated at 120° for three hours. After cooling, the reaction mixture was filtered and the crude precipitate purified by solution in 200 cc. 1 N sodium hydroxide and reprecipitation with acetic acid. After drying at 110°, the yield of 2-amino-6-thiol-8-p-chlorophenylpurine was 2.1 g.

EXAMPLE 23

2-amino-6-methylthio-8-p-chlorophenylpurine 1 g. of 2-amino-6-thiol-8-p-chlorophenylpurine (prepared in Example 21) was dissolved in 10 ml. of water by addition of 4 ml. of 1.8 N sodium hydroxide solution. To this solution was added, with shaking, 0.45 g. of dimethyl sulfate. After 10 minutes, the pH was adjusted to 5 with acetic acid and the precipitate filtered off. This precipitate was dissolved in 85 ml. of boiling water containing 4 ml. of 1.8 N sodium hydroxide, filtered hot, and the filtrate acidified with acetic acid. After cooling, filtration and drying at 110°, the yield of 2-amino-6-methylthio-8-p-chlorophenylpurine was 0.7 g.

EXAMPLE 24

2-amino-6-morpholino-8-p-chlorophenylpurine

A mixture of 1.1 g. of crude 2-amino-6-chloro-8-p-chlorophenylpurine, 3 ml. of morpholine, 0.1 ml. of concentrated hydrochloric acid and 5 ml. of absolute ethanol was refluxed for one-half hour. The reaction mixture was cooled and diluted to 100 ml. with water. The yellow precipitate, after filtration, washing and drying at 110°, consisted of 0.85 g. of 2-amino-6-morpholino-8-p-chlorophenylpurine.

EXAMPLE 25

2-amino-6-diethylamino-8-p-chlorophenylpurine

A mixture of 1.1 g. of crude 2-amino-6-chloro-8-p-chlorophenylpurine, 4 ml. of diethylamine, 0.1 ml. of concentrated hydrochloric acid and 5 ml. of absolute ethanol was refluxed for one-half hour. The reaction mixture was cooled, diluted to 100 ml. with water and made strongly acidic with hydrochloric acid. The precipitate of 2-amino-6-diethylamino-8-p-chlorophenylpurine hydrochloride hemihydrate weighed 0.83 g. after filtration, washing and drying at 110°.

EXAMPLE 26

2-amino-6-dimethylamino-8-p-chlorophenylpurine

A mixture of 1.1 g. crude 2-amino-6-chloro-8-p-chlorophenylpurine and 0.1 ml. of concentrated hydrochloric acid in 25 ml. of 33% solution of dimethylamine in methanol was heated at 60° for 1 hour. The methanol and excess dimethylamine were boiled off in a hot water bath until the volume of the reaction mixture was 5 ml. The reaction mixture was then diluted to 100 ml. with water, made strongly acidic with hydrochloric acid and the precipitate collected by filtration. The yield of 2-amino-6-dimethylamino-8-p-chlorophenylpurine hydrochloride hemihydrate was 0.86 g.

EXAMPLE 27

2-amino-6-methylamino-8-p-chlorophenylpurine 1.1 g. of crude 2-amino-6-chloro-8-p-chlorophenylpurine was dissolved by warming in 10 ml. of a 25% aqueous solution of methylamine containing 0.15 ml. of concentrated hydrochloric acid. The mixture was allowed to stand for two days at room temperature, then boiled for ca. 10 minutes to remove some of the excess methylamine. The mixture was diluted to 100 ml. with water, made strongly acid with hydrochloric acid and the precipitate filtered off. The yield of crude 2-amino-6-methylamino-8-p-chlorophenylpurine hydrochloride was 8.85 g.

EXAMPLE 28

2-amino-6-hydroxy-8-p-chlorophenylpurine 1.5 g. of crude 2-amino-6-chloro-8-p-chlorophenylpurine was refluxed for 2 hours with 100 ml. of 2 N hydrochloric acid. The mixture was cooled and the precipitate of 2-amino-6-hydroxy-8-p-chlorophenylpurine hydrochloride filtered off. After washing and drying at 110°, the yield was 1.15 g.

EXAMPLE 29

2,6-diamino-8-p-chlorophenylpurine 6.2 g. of 2-amino-6-chloro-8-p-chlorophenylpurine was heated with 75 ml. of concentrated ammonium hydroxide and 1 ml. of concentrated hydrochloric acid in a bomb at 140° for 6 hours. The contents of the bomb were evaporated to dryness on the steam bath and the residue leached with 200 ml. of water. After filtration and drying at 110°, the yield of crude 2,6-diamino-8-p-chlorophenylpurine was 5.4 g.

EXAMPLE 30

*2 - amino - 6 - (bis-β-hydroxyethyl) amino-8-p-chlorophenylpurine*

A mixture of 10.2 g. of 2-amino-6-chloro-8-p-chlorophenylpurine, 13 ml. of bis-β-hydroxyethylamine 0.5 ml. of concentrated hydrochloric acid and 75 ml. of ethanol was refluxed for two hours. The mixture was diluted with 500 ml. of water and made acidic with hydrochloric acid. The precipitate was filtered off, dissolved in 200 ml. of 0.3 N sodium hydroxide, filtered and acidified with acetic acid. The yield of 2-amino-6-(bis-β-hydroxyethyl) amino-8-p-chlorophenylpurine was 8.9 g.

EXAMPLE 31

*2-amino-6-bromo-8-p-chlorophenylpurine*

4 g. of 2,4-diamino-5-p-chlorobenzamido-6-hydroxypyrimidine were heated with 40 g. of phosphorus oxybromide at 170° for 1 hour. The excess phosphorus oxybromide was distilled off under reduced pressure and the residue treated with 150 ml. of ice water. The precipitate was filtered off, dissolved in 300 ml. of 0.4 N sodium hydroxide, filtered and acidified with acetic acid. The precipitate of 2-amino-6-bromo-8-p-chlorophenylpurine weighed 3.65 g.

EXAMPLE 32

*2-amino-6-chloro-8-o-methylphenylpurine*

4 g. of 2,4-diamino-5-o-methylbenzamido-6-hydroxypyrimidine, prepared in the usual manner from 2,4,5-triamino-6-hydroxypyrimidine bisulfite and o-methylbenzoylchloride, was refluxed for 4 hours with 150 ml. of phosphorus oxychloride. The phosphorus oxychloride was removed under reduced pressure and the residue treated with 150 g. of ice water. The precipitate was filtered off, dissolved in 100 ml. of water and 35 ml. of 2 N sodium hydroxide and reprecipitated by acidification to pH 5 with acetic acid. After filtration, washing and drying at 110°, the yield of crude 2-amino - 6 - chloro-8-o-methylphenylpurine was 1.75 g.

EXAMPLE 33

*2-amino-6-chloro-8-m-chlorophenylpurine*

12.1 g. of 2,4-diamino-5-m-chlorobenzamido-6-hydroxy-pyrimidine was refluxed for 3½ hours with 250 ml. of phosphorus oxychloride. The phosphorus oxychloride was then distilled under reduced pressure and the residue treated with 250 g. of ice. The precipitate was filtered off, dissolved in 300 ml. of 0.5 N sodium hydroxide and reprecipitated by acidification with acetic acid. After filtration, washing and drying at 110°, the yield of crude 2-amino-6-chloro-8-m-chlorophenylpurine was 9.7 g.

EXAMPLE 34

*2-amino-6-hydroxy-8-m-chlorophenylpurine*

2 g. of crude 2-amino-6-chloro-8-m-chlorophenylpurine was refluxed for 2 hours with 100 ml. of 2 N hydrochloric acid. The mixture was then diluted to 400 ml. with water, chilled and the precipitate of 2-amino-6-hydroxy-8-m-chlorophenylpurine hydrochloride filtered off. After washing and drying at 110°, the yield was 1.55 g.

EXAMPLE 35

*2-amino - 6 - hydrazino-8-m-chlorophenylpurine*

A mixture of 1 g. of crude 2-amino-6-chloro-8-m-chlorophenylpurine, 5 ml. of an 85% aqueous solution of hydrazine hydrate, 0.5 ml. of 2 N hydrochloric acid and 5 ml. of ethanol was heated in a boiling water bath for one-half hour. The reaction mixture was diluted to 100 ml. with water, brought to pH 6 with hydrochloric acid and the precipitate filtered off. After washing and drying at 110°, the precipitate of 2-amino-6-hydrazino-8-m-chlorophenylpurine hydrochloride was 0.8 g.

EXAMPLE 36

*2-amino-6-chloro-8-o-chlorophenylpurine*

6.5 g. of 2,4-diamino-5-o-chlorobenzamido-6-hydroxypyrimidine was refluxed with 200 ml. of phosphorus oxychloride for 3½ hours. The phosphorus oxychloride was removed under reduced pressure and the residue treated with 250 g. of ice. The precipitate was filtered off, dissolved in 200 ml. of 0.5 N sodium hydroxide and reprecipitated by acidification with acetic acid. The yield of crude 2 - amino-6-chloro-8-o-chlorophenylpurine was 4.1 g.

EXAMPLE 37

*2-amino-6-hydroxy-8-o-chlorophenylpurine*

2.3 g. of crude 2-amino-6-chloro-8-o-chlorophenylpurine was refluxed with 170 ml. of 2.5 N hydrochloric acid for 2 hours. The mixture was diluted to 250 ml. with water, cooled and the precipitate filtered off. The yield of crude 2-amino-6-hydroxy-8-o-chlorophenylpurine hydrochloride was 2.1 g.

EXAMPLE 38

*2-amino-6-chloro-8-p-carbomethoxyphenylpurine*

8 g. of 2,4 - diamino - 5 - p - carbomethoxybenzamido-6-hydroxypyrimidine, prepared in the usual manner from 2,4,5-triamino-6-hydroxypyrimidine bisulfite and p-carboxymethylbenzoylchloride, was refluxed for 5 hours with 250 ml. of phosphorus oxychloride. The phosphorus oxychloride was removed under reduced pressure and the residue poured on 250 g. of ice. The precipitate was filtered off, dissolved in 375 ml. of 0.5 N sodium hydroxide and reprecipitated by acidification to pH 5 with acetic acid. After centrifugation, washing and drying at 110°, the yield of crude 2-amino-6-chloro-8-p-carbomethoxyphenylpurine was 6.7 g.

EXAMPLE 39

*2-amino-6-chloro-8-(2',4'-dichlorophenyl)-purine*

9 g. of 2,4 - diamino - 5 - (2',4'- dichlorobenzamido)-6-hydroxypyrimidine, prepared in the usual manner from 2,4,5-triamino-6-hydroxypyrimidine and 2,4-dichlorobenzoylchloride, was refluxed with 250 ml. of phosphorus oxychloride for 3½ hours. The phosphorus oxychloride was removed under reduced pressure and the residue poured on 300 g. of crushed ice. The precipitate was filtered off, dissolved in 300 ml. of 0.5 N sodium hydroxide and the solution filtered into 200 ml. hot dilute acetic acid. After filtration, washing and drying at 110°, the yield of 2-amino-6-chloro-8-(2',4'-dichlorophenyl)purine was 7.2 g.

EXAMPLE 40

*2-amino-6-chloro-8-p-bromophenylpurine*

7.5 g. of 2,4-diamino-5-p-bromobenzamido-6-hydroxypyrimidine, prepared in the usual manner, were refluxed with 250 ml. of phosphorus oxychloride for 4 hours. After removal of the excess phosphorus oxychloride by distillation under reduced pressure, the residue was poured onto 250 g. of ice and the precipitate filtered off. The precipitate was dissolved in 300 ml. of 0.5 N sodium hydroxide and reprecipitated with acetic acid. The yield of crude 2-amino-6-chloro-8-p-bromophenylpurine was 4.5 g.

EXAMPLE 41

*2-amino-6-chloro-8-o-bromophenylpurine*

10 g. of 2,4-diamino-5-o-bromobenzamido-6-hydroxypyrimidine, prepared in the usual manner, was refluxed with 250 ml. of phosphorus oxychloride for 1½ hours. After removal of the excess phosphorus oxychloride under reduced pressure, the residue was treated with 300 g. of ice, and the precipitate filtered off. The precipitate was dissolved in 300 ml. of 0.5 N sodium hydroxide, filtered and reprecipitated with acetic acid. The yield of crude 2-amino-6-chloro-8-o-bromophenylpurine was 5.6 g.

The characteristics of the 8-arylpurine derivatives are such as to render their identification by melting points impracticable. Accordingly, these compounds were tested and the ultraviolet absorption spectra of certain of the derivatives was recorded as follows:

ULTRAVIOLET ABSORPTION SPECTRA OF PURINES

| Example | Purine | λ Max. at pH=1 | λ Max. at pH=11 |
|---|---|---|---|
| 1, 29 | 2,6-diamino-8-p-chlorophenyl | 320 | 245, 325 |
| 2 | 2,6-diamino-8-o-chlorophenyl | 305 | 305 |
| 3 | 2,6-diamino-8-m-chlorophenyl | 315 | 340, 325 |
| 4, 5 | 2,6-diamino-8-p-nitrophenyl | 260, 355 | 255, 400 |
| 6 | 2,6-diamino-8-m-nitrophenyl | 270, 315 | 235, 325 |
| 7 | 2,6-diamino-8-p-carbonethoxyphenyl | 240, 330 | 240, 335 |
| 8 | 2,6-diamino-8-p-methoxyphenyl | 280, 325 | 250, 320 |
| 9 | 2,6-diamino-8-m-bromophenyl | 317 | 235, 325 |
| 10 | 2,6-diamino-8-phenyl | 315 | 315 |
| 11 | 2,6-diamino-8-(3',5'-dinitrophenyl) | 325 | 235, 320 |
| 12 | 2,6-diamino-8-β-naphthyl | 248, 330 | 248, 335 |
| 13, 15, 20 | 2-amino-6-hydroxy-8-phenyl | 240, 305 | 240, 315 |
| 14 | 2-amino-6-chloro-8-phenyl | 255, 342 | 242, 335 |
| 16 | 2-amino-6-hydroxy-8-p-nitrophenyl | 245, 340 | 250, 400 |
| 17 | 2-amino-6-chloro-8-p-chlorophenyl | 260, 345 | 245, 335 |
| 18 | 2-amino-6-p-chloroanilino-8-p-chlorophenyl | 245, 310 | 245, 320 |
| 19 | 2-amino-6-n-butylamino-8-p-chlorophenyl | 245, 320 | 245, 325 |
| 21 | 2-amino-6-piperidino-8-phenyl | 240, 315 | 245, 330 |
| 22 | 2-amino-6-thiol-8-p-chlorophenyl | 265, 370 | 250, 350 |
| 23 | 2-amino-6-methylthio-8-p-chlorophenyl | 260, 340 | 235, 340 |
| 24 | 2-amino-6-morpholino-8-p-chlorophenyl | 245, 320 | 245, 330 |
| 25 | 2-amino-6-diethylamino-8-p-chlorophenyl | 245, 320 | 245, 330 |
| 26 | 2-amino-6-dimethylamino-8-p-chlorophenyl | 245, 315 | 245, 325 |
| 27 | 2-amino-6-n ethylamino-8-p-chlorophenyl | 245, 320 | 245, 330 |
| 28 | 2-amino-6-hydroxy-8-p-chlorophenyl | 245, 310 | 245, 320 |
| 30 | 2-amino-6-(bis-β-hydroxyethyl)amino-8-p-chlorophenyl. | 250, 320 | 245, 335 |
| 31 | 2-amino-6-bromo-8-p-chlorophenyl | 260, 345 | 250, 340 |
| 32 | 2-amino-6-chloro-8-o-methylphenyl | 320 | 255, 315 |
| 33 | 2-amino-6-chloro-8-m-chlorophenyl | 250, 340 | 240, 335 |
| 34 | 2-amino-6-hydroxy-8-m-chlorophenyl | 310 | 240, 320 |
| 35 | 2-amino-6-hydrazino-8-m-chlorophenyl | 310 | 240, 320 |
| 36 | 2-amino-6-chloro-8-o-chlorophenyl | 330 | 320 |
| 37 | 2-amino-6-hydroxy-8-o-chlorophenyl | 265, 295 | 302 |
| 38 | 2-amino-6-chloro-8-p-carbonethoxyphenyl | 245, 342 | 240, 338 |
| 39 | 2-amino-6-chloro-8-(3',4'-dichlorophenyl) | 330 | 320 |
| 40 | 2-amino-6-chloro-8-p-bromophenyl | 265, 342 | 250, 335 |
| 41 | 2-amino-6-chloro-8-o-bromophenyl | 325 | 315 |

The ultraviolet absorption spectra of the amides was found to be as follows:

ULTRAVIOLET ABSORPTION SPECTRA OF AMIDES

| Pyrimidines | M. Pt., Degrees | λ Max. pH=1 | λ Max. pH=11 |
|---|---|---|---|
| 2,4,6-Triamino-5-p-chlorobenzamido | d.290–95 | 272 | 270 |
| 2,4,6-Triamino-5-o-chlorobenzamido | d.260–265 | 272 | 270 |
| 2,4,6-Triamino-5-m-chlorobenzamido | d.270–80 | 272 | 270 |
| 2,4,6-Triamino-5-p-nitrobenzamido | d.265–70 | 270 | 268 |
| 2,4,6-Triamino-5-m-nitrobenzamido | d.230–40 | 270 | 268 |
| 2,4,6-Triamino-5-p-carbomethoxybenzamido | d.280–85 | 245, 270 | 245, 268 |
| 2,4,6-Triamino-5-p-methoxybenzamido | d.264–67 | 270 | 265 |
| 2,4,6-Triamino-5-m-bromobenzamido | d.265–70 | 273 | 268 |
| 2,4,6-Triamino-5-benzamido | d.266–70 | 272 | 270 |
| 2,4,6-Triamino-5-(3',5'-dinitrobenzamido) | d.280–85 | 270 | 250 |
| 2,4,6-Triamino-5-β-naphthoylamino | d.225–235 | 270 | 268 |
| 2,4-diamino-6-hydroxy-5-benzamido | d.293–98 | 240, 265 | 235, 265 |
| 2,4-diamino-6-hydroxy-5-p-nitrobenzamido | d.330–32 | 270 | 270 |
| 2,4-diamino-6-hydroxy-5-p-chlorobenzamido | d.345–50 | 245 | 240 |
| 2,4-diamino-6-hydroxy-5-o-methylbenzamido | not <350 | 265 | 265 |
| 2,4-diamino-6-hydroxy-5-m-chlorobenzamido | d.290–95 | 265 | 265 |
| 2,4-diamino-6-hydroxy-5-o-chlorobenzamido | not <350 | 265 | 255 |
| 2,4-diamino-6-hydroxy-5-p-carbomethoxybenzamido | not <350 | 250 | 245 |
| 2,4-diamino-6-hydroxy-5-(2',4'-dichlorobenzamido) | d.315 | 265 | 262 |
| 2,4-diamino-6-hydroxy-5-p-bromobenzamido | d.340–45 | 250 | 245 |
| 2,4-diamino-6-hydroxy-5-o-bromobenzamido | d.298–300 | 265 | 265 |

We claim:

1. As a new compound a 2,6-diamino-8-aryl-purine the aryl group having a maximum of two rings.

2. As a new compound a 2-amino-6-substituted amino-8-arylpurine the aryl group having a maximum of two rings.

3. As a new compound a 2-amino-6-thiol-8-arylpurine the aryl group having a maximum of two rings.

4. 2,6-diamino-8-p-chlorophenylpurine.

5. 2 - amino - 6 - hydroxy - 8 - p - chlorophenylpurine.

6. 2 - amino - 6 - methylamino - 8 - p - chlorophenylpurine.

7. 2 - amino - 6 - piperidino - 8 - p - chlorophenylpurine.

8. 2-amino-6-chloro-8-phenylpurine.

9. As a new compound a 2-amino-8-arylpurine having the following formula:

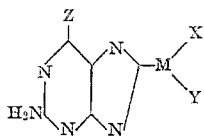

where M is an aryl radical selected from the class consisting of phenyl and naphthyl, Z is a substituent selected from the class consisting of chlorine, bromine, hydroxyl, amino, alkylamino, dialkylamino, arylamino, alkylarylamino, hydrazino, thiol, alkylthio, the N-morpholino and N-piperidino radicals bound to the 6 position through the nitrogen atom, and where X is a radical selected from the class consisting of hydrogen, amino, chlorine, bromine, lower alkyl and alkoxyl and Y is selected from the group comprising hydrogen, amino, chlorine, bromine, lower alkyl and alkoxyl, carboxy, carbalkoxy and carbamido.

10. The process of forming 8-phenylpurine derivaties which comprises preparing a 2,4-diamino-5-benzamido pyrimidine, heating the product to its melting point and recovering the 8-phenylpurine derivative from the reaction product.

11. The process of forming 8-phenylpurine derivaties which comprises preparing a 2,4-diamino-5-benzamido pyrimidine and heating the product in the presence of phosphorylchloride to produce the corresponding 8-phenylpurine.

12. The process of forming 8-naphthylpurine derivatives which comprises preparing a 2,4-diamino-5-naphthoylamino pyrimidine, heating the product to its melting point and recovering the 8-naphthylpurine derivative from the reaction product.

GEORGE H. HITCHINGS.
GERTRUDE B. ELION.

No references cited.